(12) United States Patent
Jones et al.

(10) Patent No.: US 6,219,805 B1
(45) Date of Patent: Apr. 17, 2001

(54) METHOD AND SYSTEM FOR DYNAMIC RISK ASSESSMENT OF SOFTWARE SYSTEMS

(75) Inventors: Wendell Davis Jones; Stephen J. Aud, both of Cary; John P. Hudepohl, Chapel Hill; Martin L. Flournory, Raleigh; William B. Snipes, Cary; Eric C. Schutz, Durham, all of NC (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/153,021

(22) Filed: Sep. 15, 1998

(51) Int. Cl.[7] .................................................. H02H 3/05

(52) U.S. Cl. ................................ 714/38; 714/47; 714/48; 714/33; 714/25

(58) Field of Search ................................ 714/38, 47, 48, 714/37, 25, 32, 33, 26

(56) References Cited

U.S. PATENT DOCUMENTS

| | | | |
|---|---|---|---|
| 5,655,074 | * | 8/1997 | Rauscher .......................... 395/183.14 |
| 6,079,031 | * | 6/2000 | Haley et al. ............................ 714/38 |
| 6,151,688 | * | 11/2000 | Wipfel et al. .......................... 714/48 |

OTHER PUBLICATIONS

V. Basili et al., "A Validation of Object–Oriented Design Metrics as Quality Indicators," IEEE Transactions on Software Engineering, vol. 22, No. 10, Oct. 1996, pp. 751–761.
C. Ebert, "Classification Techniques for Metri–based Software Development," Software Quality Journal 5, Dec. 1996, pp. 255–272.
Evanco et al., "A Composite Complexity Approach for Software Defect Modelling," Software Quality Journal 3, Mar. 1994, pp. 27–44.
J. Henry et al., "Improving Software Maintenance at Martin Marietta," IEEE Software, Jul. 1994, pp. 67–75.
T.M. Khoshgoftaar et al., "Using Process History to Predict Software Quality," Computer, Apr. 1998, pp. 66–72.
T.M. Khoshgoftaar et al., "Software Metrics: Charting the Course," Computer, Sep. 1994, pp. 13–15.
B. Kitchenham et al., "Software Quality: The Elusive Target," IEEE Software, Jan. 1996, pp 12–21.
J. Mayrand et al., "System Acquisition Based On Software Product Assessment," In Proceedings of 18th International Conference on Software Engineering, IEEE Computer Society Press, Mar. 1996, pp. 210–219.
H. Ogasawara et al., "Experiences of Software Quality Management using Metrics through the Life–Cycle", In Proceedings of 18th International Conference on Software Engineering, IEEE Computer Society Press, Mar. 1996, pp 179–188.

(List continued on next page.)

*Primary Examiner*—Norman Michael Wright

(57) ABSTRACT

A method and system for assessing risks associated with software systems include the steps of dynamically retrieving, from a plurality of external database systems, a set of risk factor data associated with the components of the software systems, and determining risk values of the components, respectively, based on a predefined risk model and the retrieved risk factor data. The retrieved risk factor data represents a multi-dimensional view of the potential risks associated with the components, and may include two or more of code complexities, architectural relationships, fault histories, development activities, designer profiles, component contention, and/or usage profiles of the software components. The risk model includes a set of risk relations that associate the retrieved risk factor data with the risk values of the components. The risk relations may be defined by correlating historical risk factor data with actual risk measurements of the components using statistical or other quantitative methods. Alternatively, the risk relations may be defined by a set of rules, which associate the retrieved risk factor data with the risk values of the components.

8 Claims, 5 Drawing Sheets

OTHER PUBLICATIONS

N. Ohlsson et al., "Predicting Fault–Prone Software Modules in Telephone Switches," IEEE Transactions on Software Engineering, vol. 22, No. 12, Dec. 1996, pp. 886–894.

N. Ohlsson et al., "Application of Multivariate Analysis for Software Fault Prediction," Software Quality, Journal 7, 1998, pp. 51–66.

S.L. Pfleeger, "Assessing Measurement," IEEE Software, Mar. 1997, pp. 25–26.

N. Schneidewind, "Controlling and Predicting the Quality of Space Shuttle software Using Metrics," Software Quality Journal 4, Jan. 1995, pp. 49–68.

N. Schneidewind, "Software Metrics Model for Integrating Quality Control and Prediction," IEEE Computer Society, Nov. 1997, pp. 402–415.

G. Stark et al., "Using Metrics in Management Decision Making," Computer, Sep. 1994, pp. 42–48.

R. Hochman et al., "Using the genetic Algorithm to Build Optimal Neural Networks for Fault–Prone Module Detection," IEEE Computer Society, Oct. 1996, pp 152–162.

J.P. Hudepohl et al., "Emerald: Software Metrics and Models on the Desktop," IEEE Software, 13, Sep. 1996, pp. 56–60.

S. Lauesen et al., "Is Software Quality Visible in the Code," IEEE Software, 15, Jul./Aug. 1998, pp. 69–73.

T.M. Khoshgoftaar et al., "Detection of Fault–Prone Program Modules in a Very Large Telecommunications System," IEEE Computer Society, Oct. 1995, pp. 24–33.

T. M. Khoshgoftaar et al., "Early Quality Prediction: A Case Study in Telecommunications," IEEE Software, Jan. 1996, pp. 65–71.

T. M. Khoshgoftaar et al., "Detection of Fault–Prone Software Modules During a Spiral Life Cycle," IEEE Computer Society Press, 1996, pp. 69–76.

J. Munson et al., "The Detection of Fault–Prone Programs," IEEE Transactions on Software Engineering, vol. 18, No. 5, May 1992, pp. 423–433.

D. L. Lanning et al., "The Impact of Software Enhancement on Software Reliability," IEEE Transactions on Reliability, Dec. 1995, pp. 677–682.

T.M. Khoshgoftaar et al, "Process measures for Predicting Software Quality," High Assurance Systems Engineering Workshop (HASE '97), IEEE Computer Society Press, 1997, pp. 155–160.

L.C. Briand et al., "Developing Interpretable Models with Optimized set Reduction for Identifying High–Risk Software Components," IEEE Transactions on Software Engineering, vol. 19, No. 11, Nov. 1993, pp. 1028–1043.

G.S. Cherf, "An Investigation of the Maintenance and Support Characteristics of Commercial Software," Software Quality Journal 1, Sep. 1992, pp.147–158.

K.H. Moller et al., "An Empirical Investigation of Software Fault Distribution," In Proceedings of First International Software Metrics Symposium, IEEE Computer Society Press, May 1993, pp. 82–90.

M. Daskalantonakis, "A Practical View of Software Measurement and Implementation Experiences Within Motorola," IEEE Transactions on Software Engineering, Nov. 1992, pp. 998–1010.

T.M. Khoshgoftaar et al., "Application of Neural Networks to Software Quality Modeling of a Very Large Telecommunications System," IEEE Transactions on Neural Networks, vol. 8, No. 4, Jul. 1997, pp. 902–909.

J. Hudepohl et al., "EMERALD: A Case Study In Enhancing Software Reliability," In Proceedings of $8^{th}$ International Symposium on Software Reliability Engineering, IEEE Computer Society, Nov. 1997, pp. 85–91.

* cited by examiner

METHOD AND SYSTEM FOR DYNAMIC RISK ASSESSMENT OF SOFTWARE SYSTEMS

FIELD OF THE INVENTION

The present invention generally relates to software development tools, and more particularly, to a method and system for assessing risks associated with software systems.

BACKGROUND OF THE ART

Software systems are growing in complexity and are playing an important role in various industries. As a result, the users of software systems are demanding higher quality software systems, which, for example, have zero service downtime. Furthermore, the software industry is also placing greater demands on software developers by continually raising software quality standards. For example, in the telecommunications industry, network outages or even brief interruptions of service can have significant effect on users. A user, such as a bank, may lose millions of dollars during a brief service outage. On a more global scale, failure of densely interconnected networks essential to government operations may pose a national security risk.

To minimize the risk associated with software systems, and thus to increase the quality of the software systems, existing quality assurance tools generate and track, at various phases of the software development life cycle, risk factor data, for example, metrics associated with the modifications made to software systems during the development life cycle. Risk factor data typically includes code complexity metrics and development process metrics, which aid software developers in assessing or predicting risk associated with software systems.

Software developers have integrated these tools into various phases of the software development life cycle. For example, software developers use the code complexity metrics to identify the components that have greater risk to intensify the line-by-line inspection of the identified components. Similarly, development process metrics aid software testers to identify high risk components and to develop comprehensive plans for testing these components.

The existing quality assurance tools, however, narrowly focus on only one type of risk factor such as code complexities and development process metrics. As a result, the resulting risk assessment is not useful in many circumstances because accurate risk assessments generally cannot be based on a single risk factor. Although various other types of risk factor data can be measured separately or collectively by the existing tools, these factors generally are not used in making risk assessments, in part, because the interaction of these factors among each other and the effect of these factors on the risk assessments are not known.

Thus, it is desirable to have a method and system for assessing risks of software systems without the above-mentioned disadvantages.

DISCLOSURE OF THE INVENTION

Methods and systems consistent with the present invention, as embodied and broadly described herein, assess risks associated with the components of a software system by identifying a set of risk factors associated with the components, defining a risk model based on the identified set of risk factors, dynamically retrieving, from a plurality of external database systems, data associated with the set of risk factors, and determining risk values associated with the components, respectively, by inputting into the risk model the retrieved data. Furthermore, methods and systems consistent with the present invention determine risk ratings associated with the components by comparing the determined risk values with a set of predetermined thresholds, respectively. The risk ratings can directly or indirectly suggest an appropriate action in a process control environment.

The retrieved risk factor data represents a multi-dimensional view of the potential risks associated with the components, and may include, for example, two or more of code complexities, architectural relationships, fault histories, development activities, designer profiles, component contention, and/or usage profiles of the software components. The risk model includes a set of risk relations that associate the retrieved risk factor data with the risk values of the components.

A risk value represents, for example, a likelihood of discovering a fault or an expected number of faults associated with a component (fault-proneness), probability of a component failure due to a fault (reliability), probability of injecting or unmasking a fault over time (fault rate), and/or an expected repair cost due to potential faults associated with a component (cost of poor quality). A risk measurement represents a measurable aspect of a risk value associated with a component, which may include, for example, number of faults per component, number of faults per lines of code, number of failures per usage time, and/or cost of fault repair per failure. In other words, a risk value represents a forecast or an expectation of what a risk measurement will be at some future time.

This summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

BEST MODE FOR CARRYING OUT THE INVENTION

The following description of embodiments of this invention refers to the accompanying drawings. Where appropriate, the same reference numbers in different drawings refer to the same or similar elements.

A method and system consistent with the present invention assess risks associated with a software system by dynamically retrieving, from a plurality of external database systems, a set of risk factor data associated with the components of the software system, and determining the risks associated with the components, respectively, based on a predefined risk model and the retrieved risk factor data. The retrieved risk factor data represents a multi-dimensional view of the potential risks associated with the components, and may include, for example, two or more of code complexities, architectural relationships, fault histories, development activities, designer profiles, component contention, and/or usage profiles of the software components. The risk model includes a set of risk relations that associate the retrieved risk factor data with the risk values of the components. The risk relations may be defined by correlating historical risk factor data with actual risks measurements using statistical or other quantitative methods. Alternatively, the risk relations may be defined by a set of rules, which associate the retrieved risk factor data with the risk values of the components.

Figure 1:
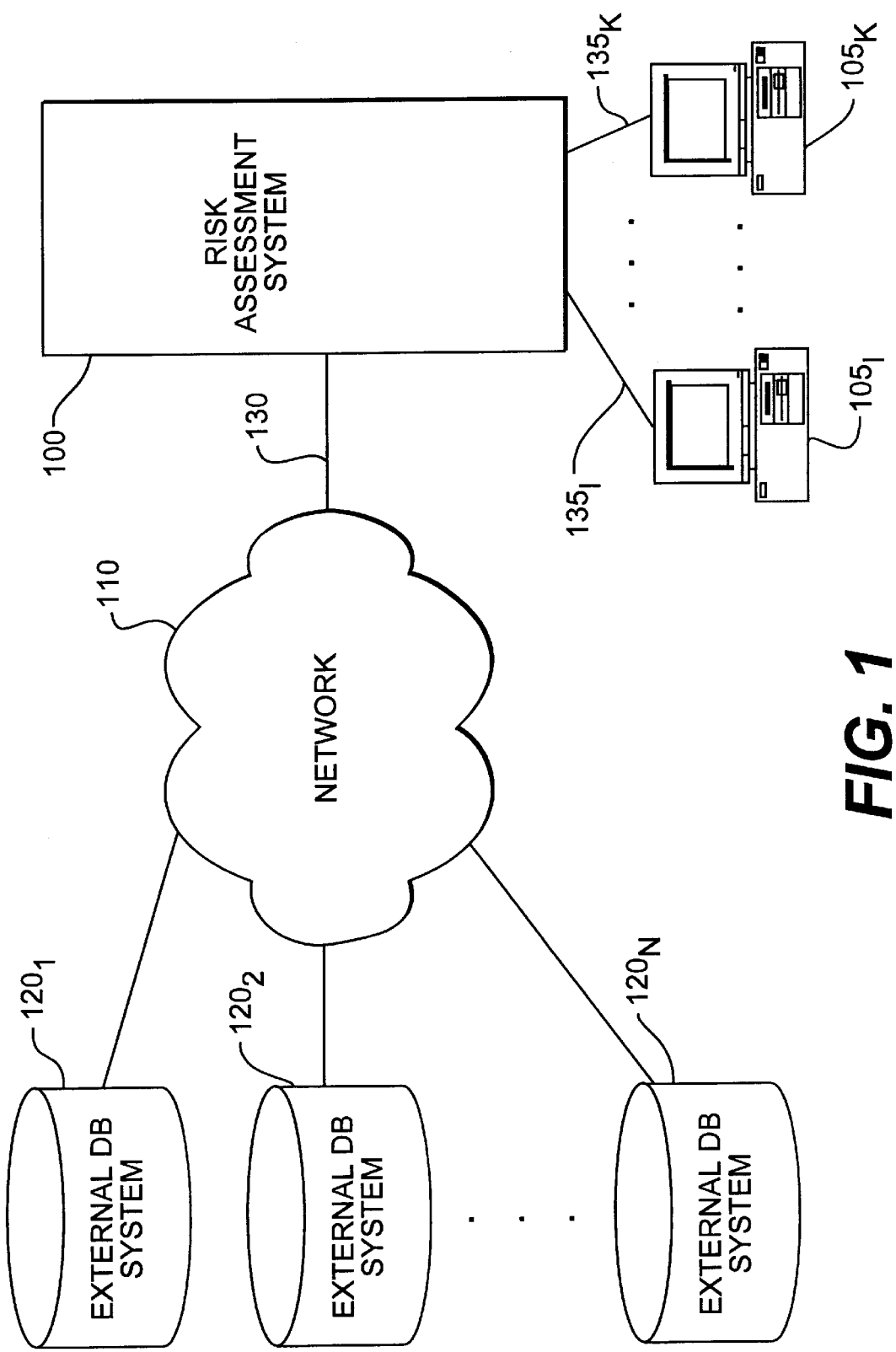
FIG. 1 is a block diagram of external interfaces of a risk assessment system in accordance with an embodiment of the invention.

FIG. 1 is a block diagram of external interfaces of a risk assessment system 100 in accordance with an embodiment of the invention. Risk assessment system 100 interfaces user terminals $105_1$–$105_K$ and network 110 via links $135_1$–$135_K$ and link 130, respectively. Network 110 may be, for example, an Ethernet network, which interfaces with external database systems $120_1$–$120_N$. Each external database systems $120_1$–$120_N$ may, for example, be a software configuration management system, software system problem tracking and reporting database, and/or any other repository of information related to a software system, and may reside in computers (referred to as nodes), which may have the same or different hardware and operating system platforms. Terminals $105_1$–$105_K$ may each run a graphical user interface program, for example Unix Motif, and/or support telnet command-line interface for communicating with risk assessment system 100.

Figure 2:
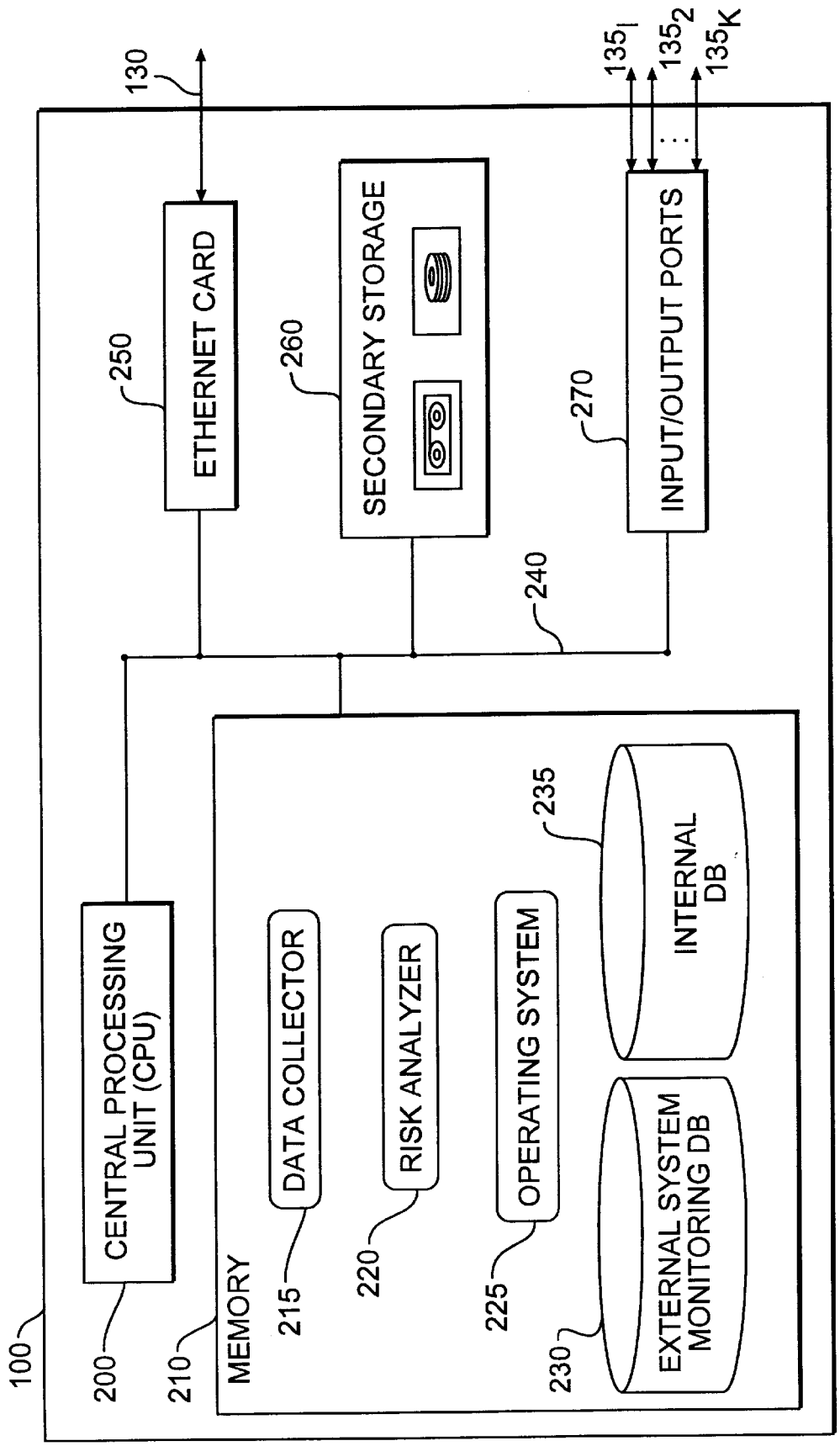
FIG. 2 is a block diagram of a risk assessment system in accordance with an embodiment of the invention.

FIG. 2 is a block diagram of risk assessment system 100 in accordance with an embodiment of the invention. Risk assessment system 100 comprises central processing unit (CPU) 200 connected via bus 240 to memory unit 210, Ethernet card 250, secondary storage 260, and input/output ports 270. Ethernet card 250 interfaces with network 110 via link 130. Ports 270 interface with user terminals $105_1$ through $105_K$ via links $135_1$ through $135_K$, respectively. Risk assessment system 100 may be implemented on, for example, Hewett Packard 9000 series hardware.

Memory unit 210 includes data collector 215, risk analyzer 220, operating system 225, external system monitoring database (monitoring_db) 230, and internal database (internal_db) 235. Data collector 215, risk analyzer 220, and operating system 225 each include a set of software instructions which CPU 200 executes. Operating system 225 may be, for example, Unix version 5.0. The processing and functionality performed by data collector 215 and risk analyzer 220 are described below.

Secondary storage 260 comprises a computer readable medium such as a disk drive and a tape drive. From the tape drive, software and data may be loaded onto the disk drive, which can then be copied into memory unit 210. Similarly, software and data in memory unit 210 may be copied onto the disk drive, which can then be loaded onto the tape drive.

Figure 3:
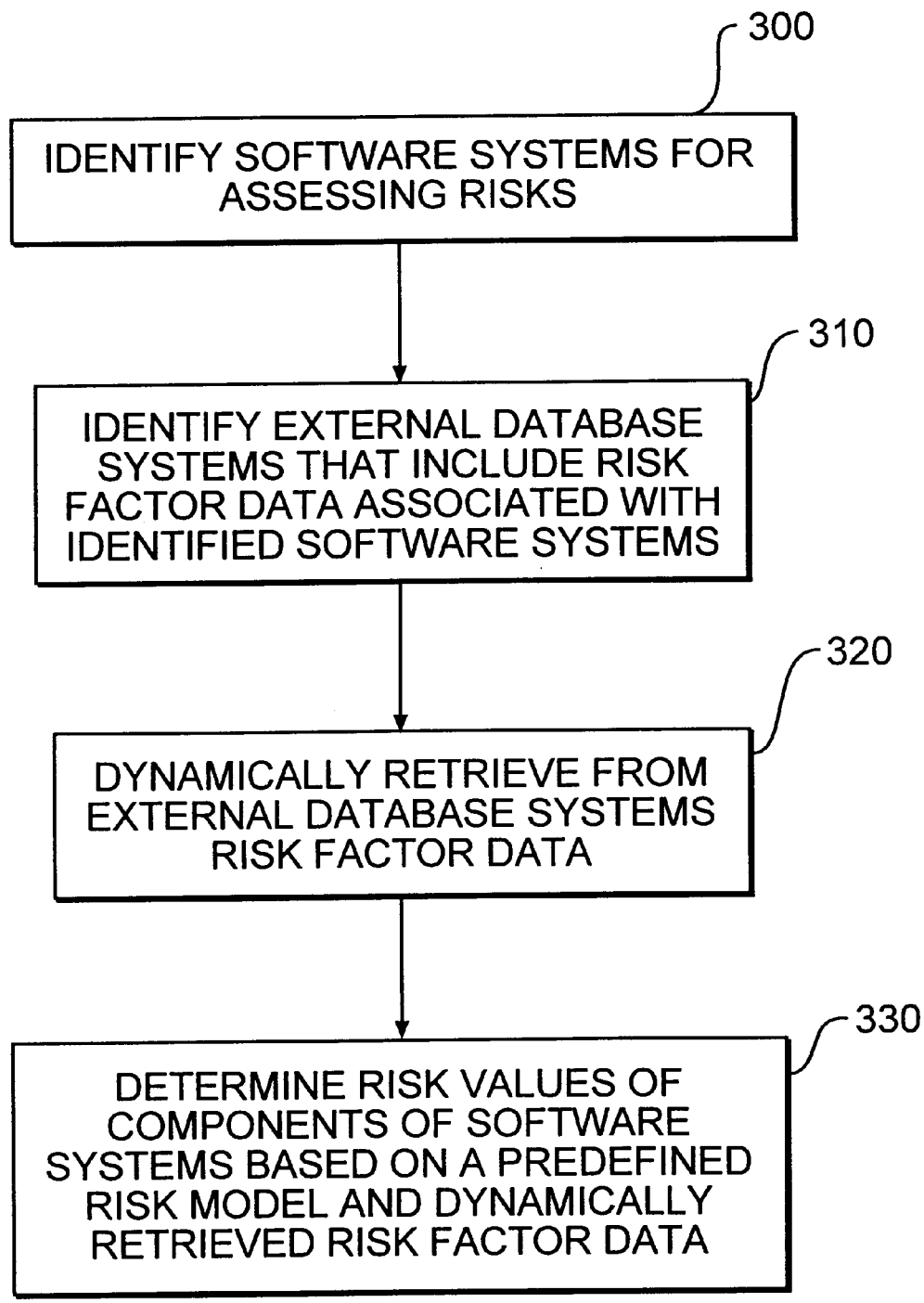
FIG. 3 is a flow chart of the steps a risk assessment system performs to assess risks associated with the components in a plurality of software systems in accordance with an embodiment of the invention.

FIG. 3 is a flow chart of the steps for assessing risks associated with components in a plurality of software systems in accordance with an embodiment of the invention. A user may identify one or more software systems whose fault-proneness are to be assessed by risk assessment system 100 (step 300). The user then identifies external database systems $120_1$–$120_N$, each of which includes a portion or all of the risk factor data associated with the identified software systems (step 310). The risk factor data may be manually generated by users of external database systems $120_1$–$120_N$ and/or automatically generated by the external database systems $120_1$–$120_N$. External database system $120_1$–$120_N$ may automatically generate code complexity metrics for components in a software system by using, for example, the DATRIX™, CANTATA™, and/or LOGISCOPE™ software analyzers, which are developed by Bell Canada, IPL, and Verilog S. A., respectively.

The set of risk factor data may include, for example, code complexities, architectural relationship metrics, fault histories, development activity metrics, designer profiles, component contention, and usage profiles associated with components in a software system. Risk assessment system 100 may include a set of risk factor data examples of which are shown in Tables I through VII. Code complexities metrics may include, for example, any abstraction of a component that is related to the degree of difficulty in interacting, constructing, understanding, interpreting, and/or modifying the component. Architectural relationship metrics may include, for example, a measure of the extent of coupling between components.

Fault histories may include, for example, a historical record of faults associated with a component. The faults may be categorized by impact, type, origin, method of discovery, responsible entity for fixing the fault, and resolution of the fault.

Development activity metrics may include, for example, any activity that is related to the development of a component and/or software system. The activity may be related to, for example, planning, designing, implementation, verification, testing, and deployment of the component and/or the software system.

Designer profiles may include, for example, any measure of the ability, performance, and history of software development personnel assigned to a component. Component contention may include, for example, any measure of the difficulty in sharing and using common resources among components. Usage profiles may include, for example, any measure of the contribution of a component to a set of uses that a software system may execute along with the probabilities of the execution of the set of uses.

TABLE I

CODE COMPLEMTY METRICS a combination of number of logical comments, number of declarative statements, number of arcs, average conditional arc complexity, number of loop constructs, number of calls to other components, number of modes, number of alphanumeric characters in the comments in declaration sections, comments volume in structure, structural volume, and number of complexity metrics that are out of range
total number of include components
number of distinct include components
number of changed lines in the component from the previous issue
number of deleted lines in the component from the previous issue
number of new lines in the component from the previous issue
number of basic utility routines
number of specific sub-task routines
number of switching routines
number of decisional routines
number of algorithmic routines
number of complexity metrics out of range

TABLE I-continued

CODE COMPLEMTY METRICS commented arcs percentage
number of arcs
number of calls to others
unique calls to others
average conditional arc complexity
maximal conditional arc complexity
number of conditional arcs
average conditional arc span
maximum conditional arc span
number of alphanumeric characters in the comments in the declaration sections
number of logical comments
comments volume ratio
comments volume in structure
number of breaches in control structure
weighted number of breaches in control structure
average commented control structure
average control structure nesting
maximal control structure nesting
weighted mean control structure nesting
structural volume

TABLE II

ARCHITECTURAL RELATION METRICS architectural layer of component (e.g., base, intermediate, application, applet)
level of inheritance of component (object oriented components only)
total coupling of component (i.e., measure of interconnectedness, where the total coupling is the sum of coupling between the component and all other components)
total data coupling of component
total global variable coupling of component
total content coupling component
total control coupling of component
maximum coupling between component and all other components

TABLE III

FAULT HISTORY METRICS total number of customer problems fixed in this component during development of the current release
number of field (external) problems found in the component of the release
total number of internal problems fixed in this component during development of the current release
number of internal problems found in this component during development of the current release
total number of problems fixed in this component during development of the current release
total number of beta test problems fixed in this component during development of the current release

TABLE IV

DEVELOPMENT ACTIVITY METRICS total number of changes to the code for feature reasons in the current release
net increase in source line of code (LOC) due to software changes in the current release
net new and changed source LOC due to software changes in the current release
size of component in LOC for the last issue of the current release
total number of changes to the code for any reason in the current release

TABLE V

DESIGNER PROFILE METRICS the average number of updates that designers have had in their career when they updated this component for any reason in the current release
number of updates for any reason to this component in the current release by designers who have had 20 or less total updates in their entire career
number of updates for any reason to this component in the current release by designers who have had 10 or less total updates in their entire career

TABLE VI

COMPONENT CONTENTION METRICS number of different features for which the component was modified during current release
number of different designers who have modified this component in the current release

TABLE VII

USAGE PROFILE METRICS weighted frequency of execution of the component
estimated number of sites in which the component is deployed As described in detail below, data collector 215 in risk assessment system 100 dynamically retrieves from external database systems $120_1$–$120_N$ the risk factor data associated with the software systems (step 320). Data collector 215 then stores the retrieved risk factor data in internal_db 235.

Finally, risk analyzer 220 in risk assessment system 100 determines the failure probabilities of each component of each software system based on a predefined risk model and the retrieved risk factor data (step 330). Specifically, risk analyzer 220 inputs into the risk model the risk factor data associated with each component in a software system, and the risk model outputs a risk value, for example a failure probability, for each component. In addition, risk analyzer 220 determines a set of risk ratings for the components by comparing each determined risk value with a set of predetermined thresholds, respectively.

The risk model includes a set of predefined risk relations that associate the risk factor data with the risk value of each component. The risk relations may be represented as transfer functions, a set of rules, and/or a logic system. Transfer functions may defined by, for example, correlating historical risk factor data with actual risk measurements using statistical or other quantitative methods, including pattern recognition. The statistical or quantitative methods may include, for example, discriminant analysis, logistic regression, multiple linear regression, non-linear regression, chi-square automated interaction detection (CHAID), classification and regression trees, decision trees, artificial neural networks, and/or polynomial neural networks. The particular methods used may depend upon the risk measurements, the types of risk factor data, the predictive accuracy requirements of the risk model, the interpretability requirements of the risk model, and/or other criterion known to one of ordinary skill in the art. Furthermore, a risk relation may be hierarchically defined as a function of other risk relations, and can be, for example, enhanced or recalibrated over time based on new risk measurements and risk factor data.

In accordance with one embodiment, the risk model may be implemented as follows: A user, for example a software developer or a systems analysts, identifies the external database systems that include potential risk factor data associated with a software system. The user retrieves from the identified external database systems the potential risk factor data. The user may identify a candidate list of risk factor data by merging some of the potential risk factor data that have common elements. The user may then refine the candidate list of risk factor data by, for example, converting risk factor data that are in categorical form into quantitative format, estimating risk factor data that are unavailable, and/or readjusting the risk factor data that may have extreme values. Finally, the user identifies a set of risk relations that correlate the refined risk factor data with actual risk measurements associated with the software system using statistical or other quantitative methods. The set of risk relations define a risk model, which may be implemented in form of software. In addition, the set of risk relations may be enhanced or recalibrated over time based on new risk factor data and risk measurements.

In accordance with another embodiment, the risk model may be implemented as an expert system using, for example, artificial intelligence. A user identifies the risk factor data associated with a software system. The user then applies a set of rules, which may, for example, be in form of software or script, to the risk factor data. Alternatively, the user may input the risk factor data into a logic system. The rules and/or logic system define a set of relationships between the risk factor data and risk value of each component in the software system. For example, one rule may be that if a component is modified, then the number of failures per usage month associated with the component is 0.5. Another rule may be that if a component is not modified, then the number of failures per usage month associated with the component is 0.01. The set of rules and/or logic system may also be enhanced over time based on expert opinion or new information.

DATA COLLECTOR

Figure 4:
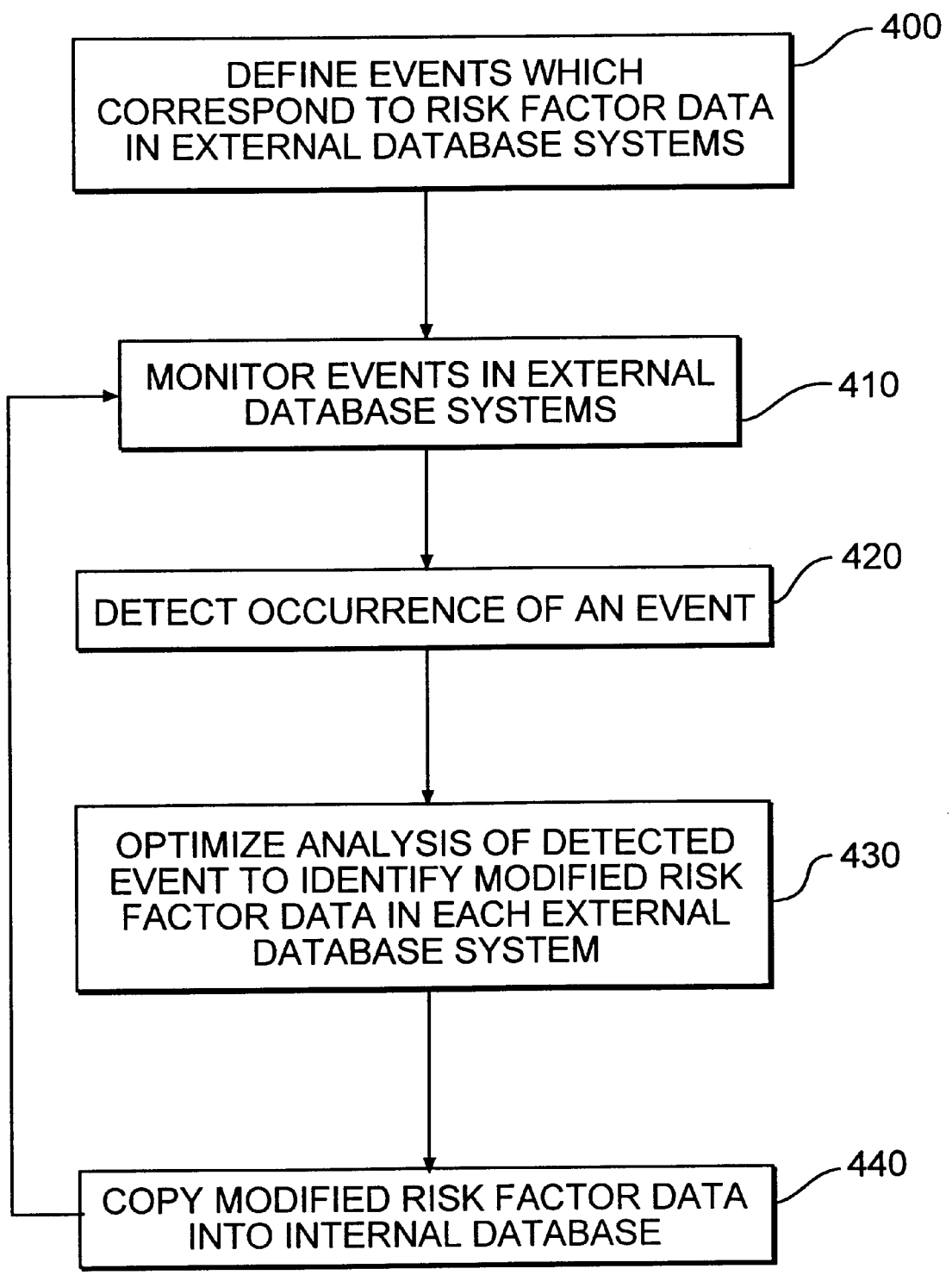
FIG. 4 is a flow chart of the steps that a data collector program performs to dynamically retrieve risk factor data associated with software systems in accordance with an embodiment of the invention.

FIG. 4 is a flow chart of the steps that data collector 215 program performs to dynamically retrieve risk factor data in accordance with an embodiment of the invention. From a screen generated locally in terminal 105, for each software system, a user defines events corresponding to risk factor data residing in external database systems $120_1$–$120_N$ (step 400). The user may define an event by identifying, for example, the TCP/IP address of the node in which an external database system resides (node), the full directory path of the location of the external database system in that node (source_id), the name of the software system (product), the release of the product (release), and the parameters for querying one or more of external database systems $120_1$–$120_N$ to retrieve risk factor data associated with the identified product and release. Data collector 215 captures from the screen the information inputted by the user and stores the information in an events_definition table (not shown) in monitoring_db 230. Data collector 215 also stores the status of the event (status) and the date and time of an occurrence of the event (date_time) in an events_status table (not shown) in monitoring_db 230.

Data collector 215 then monitors the defined events in external database systems $120_1$–$120_N$ (step 410). Specifically, using the defined parameters stored in monitoring_db 230, data collector 215, at fixed time intervals, queries each external database system $120_1$–$120_N$ to determine whether a product and release has been modified. Data collector 215 establishes TCP/IP sockets through network 110 to a set of external system interface modules (esi_module, also referred to as application program interface) associated with external database system $120_1$–$120_N$, respectively. Each respective esi_module runs on the same node as its respective external database system $120_1$–$120_N$, and queries its respective external database system $120_1$–$120_N$ using pre-configured commands, which may be different for each external database system $120_1$–$120_N$.

Data collector 215 detects the occurrence of an event for a particular product and release when queries to external database systems $120_1$–$120_N$ indicate a change in these databases (step 420). Data collector 215 may identify these changes by, for example, querying for risk factor data that has been modified since last time data collector 215 queried the databases. When data collector 215 detects an event, data collector 215 updates the status and date_time fields in the events_status table.

Data collector 215 then processes the results of the queries received from each esi_module to identify the relevant risk factor data that has been modified in each external database system $120_1$–$120_N$ by, for example, comparing the results of the queries with the risk factor data stored in internal_db 235 (step 430). Data collector 215 then copies the relevant modified risk factor data from external database systems $120_1$–$120_N$ into internal_db 235 (step 440). Furthermore, data collector 215 may copy the relevant modified risk factor data into internal_db 235 as a single transaction. Data collector 215 may store the risk factor data by, for example, product, release, and component. Finally, data collector 215 resets the status field in the events_status table and continues to monitor events in external database systems $120_1$–$120_N$ (step 410).

RISK ANALYZER

Figure 5:
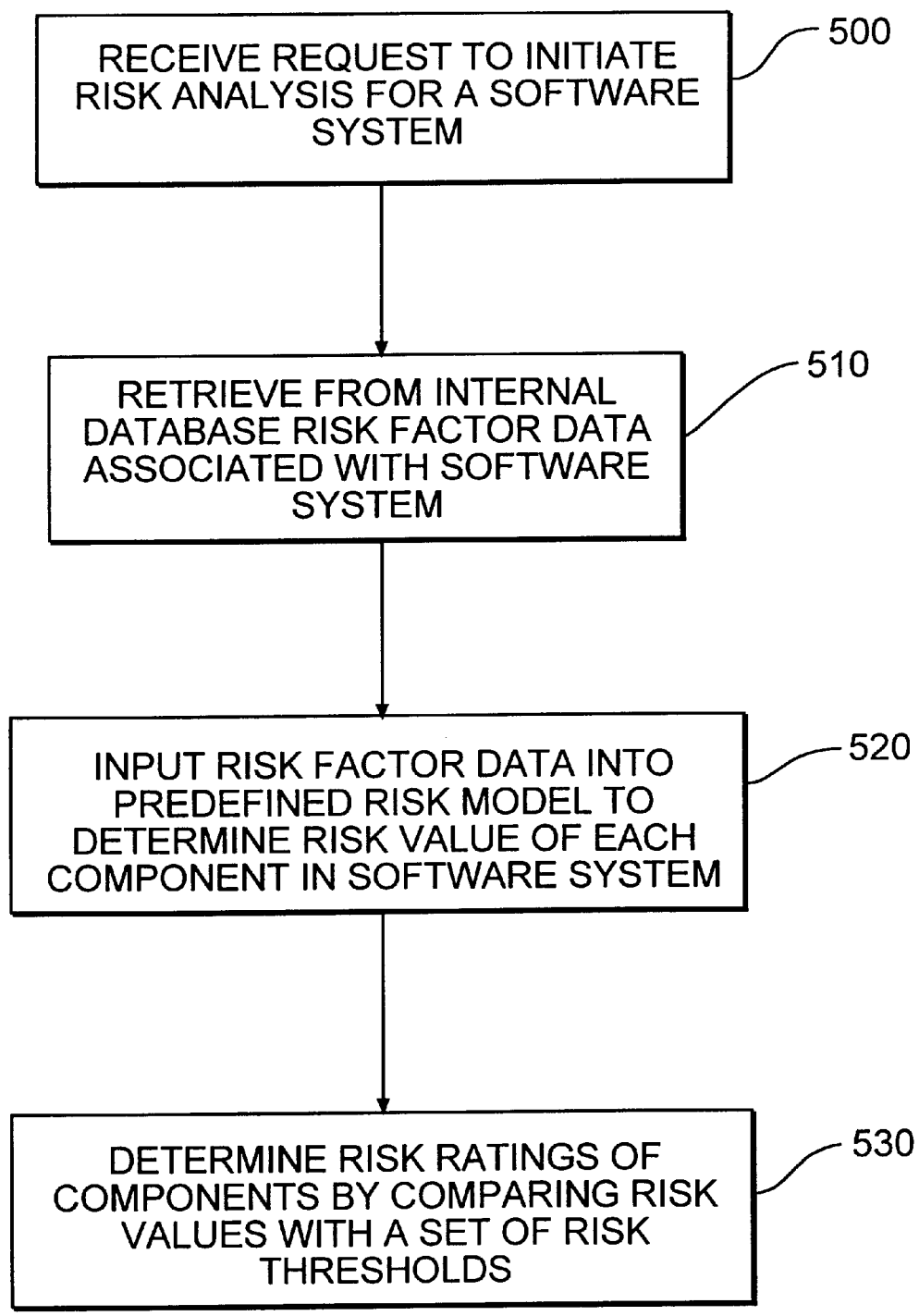
FIG. 5 is a flow chart of the steps that a risk analyzer program performs to determine risks associated with the components in a software system in accordance with an embodiment of the invention.

FIG. 5 is a flow chart of the steps risk analyzer 220 program performs to assess risks associated with the components of a software system in accordance with an embodiment of the invention. Risk analyzer 220 receives a request from, for example, user terminal $105_1$ to initiate risk analysis for a software system identified by product and release (step 500). Risk analyzer 220 then retrieves from internal_db 235 the risk factor data associated with the identified product and release (step 510). For each component in the product and release, risk analyzer 220 inputs its associated risk factor data into the predefined risk model to determine a risk value associated with the component (step 520). Risk analyzer 220 sends the determined risk values of the components to user terminal $105_1$ to be displayed. Finally, risk analyzer 220 determines a risk rating for each component by comparing the determined risk value of the component with a set of predetermined thresholds (step 530). Similarly, risk analyzer 220 sends the determined risk ratings of the components to user terminal $105_1$ to be displayed. In addition, risk analyzer 220 may store the determined risk values and the risk ratings in internal_db 235, from which users can then generate reports at various phases of the development cycle.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for assessing risks associated with components in a software system, said method comprising the steps of:

identifying a set of risk factors associated with the components, wherein the risk factors include two or more of code complexities, architectural relationships, fault histories, development activities, designer profiles, component contention, and usage profiles of the software components;

defining a risk model based on the identified set of risk factors for determining risk values of the components, respectively, wherein the risk model comprises a set of risk relations that associate the set of risk factors with risk values of the components;

dynamically retrieving, from a plurality of external databases, data associated with the set of risk factors; and determining the risk values of the components, respectively, by inputting into the risk model the retrieved data.

2. The method of claim 1 further comprising the step of:

determining a set of risk ratings associated with the components by comparing the determined risk values with a set of pre-determined thresholds, respectively.

3. The method of claim 1, wherein said retrieving step comprises the steps of:

monitoring a set of pre-defined events that correspond to modifications of the external databases;

identifying the data that is modified in the external databases; and transferring the modified data into an internal database.

4. A system for assessing risks associated with components in a software system, comprising:

a memory including:

a data retriever program for dynamically retrieving, from a plurality of external databases, risk factor data that includes two or more of code complexities, architectural relationships, fault histories, development activities, designer profiles, and usage profiles of the components;

a risk analyzer program for determining risk values of the components based on the dynamically retrieved data and a pre-defined risk model, wherein the risk model comprises a set of risk relations that associate the retrieved risk factor data with the risk values of the components; and a processor for running the data retriever program and the risk analyzer program.

5. A method for assessing risks associated with components in a software system, said method comprising the steps of:

dynamically retrieving, from a plurality of external databases, risk factor data associated with the components, wherein the risk factor data includes two or more of code complexities, architectural relationships, fault histories, development activities, designer profiles, component contention, and usage profiles of the software components; and determining risk values of the components, respectively, based on a predefined risk model and the retrieved risk factor data, wherein the risk model comprises a set of risk relations that associate the retrieved risk factor data with the risk values of the components.

6. The method of claim 5 further comprising the step of:

determining a set of risk ratings associated with the components by comparing the determined probabilities with a set of pre-determined thresholds, respectively.

7. The method of claim 5, wherein said retrieving step comprises the steps of:

monitoring a set of pre-defined events that correspond to modifications of the external databases;

identifying the risk factor data that is modified in the external databases; and transferring the modified risk factor data into an internal database.

8. A computer-readable medium capable of configuring a computer to perform a method for assessing risks associated with components in a software system, said method comprising the steps of:

dynamically retrieving, from a plurality of external databases, risk factor data associated with the components, wherein the risk factor data includes two or more of code complexities, architectural relationships, fault histories, development activities, designer profiles, component contention, and usage profiles of the software components; and determining risk values of the components, respectively, based on a predefined risk model and the retrieved risk factor data, wherein the risk model comprises a set of risk relations that associate the retrieved risk factor data with the risk values of the components.

* * * * *